(12) United States Patent
Falchero et al.

(10) Patent No.: US 7,331,765 B2
(45) Date of Patent: Feb. 19, 2008

(54) TWO-SWEEP ROTARY WING BLADE WITH LIMITED TAPER RATIO

(75) Inventors: Danlèle Falchero, Ventabren (FR); Gilles Arnaud, Marseilles (FR); Frédéric Beroul, Aix en Provence (FR); Joëlle Bailly, Clamart (FR); Philippe Beaumier, Chatenay-Malabry (FR); Yves Delrieux, Le Plessis Robinson (FR)

(73) Assignees: Eurocopter, Mariguane (FR); Office National D'Etudes et de Recherches Aerospatiales, Chatillon (FR)

( * ) Notice: Subject to any disclaimer, the term of this patent is extended or adjusted under 35 U.S.C. 154(b) by 325 days.

(21) Appl. No.: 11/038,231

(22) Filed: Jan. 21, 2005

(65) Prior Publication Data
US 2005/0158175 A1 Jul. 21, 2005

(30) Foreign Application Priority Data
Jan. 21, 2004 (FR) .................................. 04 00529

(51) Int. Cl.
*B64C 27/46* (2006.01)
*B64C 11/18* (2006.01)

(52) U.S. Cl. ..................................... 416/228; 416/237
(58) Field of Classification Search ................ 416/228, 416/223 R, 231 B, 231 R, 235, 237
See application file for complete search history.

(56) References Cited

U.S. PATENT DOCUMENTS 6,116,857 A 9/2000 Splettstoesser et al.
2005/0281676 A1* 12/2005 Egolf et al. .................. 416/228

FOREIGN PATENT DOCUMENTS

JP 2002308192 10/2002

* cited by examiner

*Primary Examiner*—Edward K. Look
*Assistant Examiner*—Dwayne J White
(74) *Attorney, Agent, or Firm*—Young & Thompson

(57) ABSTRACT

A rotary wing blade of limited taper ratio, comprising in succession along a reference radius: an inner zone; a forward-swept zone; and a back-swept zone. In addition, the beginning of the forward-swept zone lies in the range 0.47 to 0.65 times the reference radius R of the rotary wing. Furthermore, the leading edge of the blade at the reference radius presents an angle γ lying in the range −40° and −65° relative to the general axis of the blade.

20 Claims, 1 Drawing Sheet

TWO-SWEEP ROTARY WING BLADE WITH LIMITED TAPER RATIO

The present invention relates to a two-sweep blade with limited taper ratio for a rotary wing. A rotary wing is the member that serves to provide an aircraft such as a helicopter with lift and with horizontal propulsion.

BACKGROUND OF THE INVENTION

Such a wing must naturally present aerodynamic performance suitable for driving the helicopter to which it is fitted. It must also satisfy ever-more restrictive standards for noise certification. As a result, the shape of a blade is defined nowadays while taking account of both of these aspects, which can sometimes be contradictory.

The dimensional considerations that govern the aerodynamic performance of a blade are set out in particular in patent document FR 2 689 852, which is incorporated herein by reference.

Concerning the noise effects of the shape of a blade, knowledge is much less advanced.

Nevertheless, a multi-zone blade is known that comprises, starting from the axis of the rotary wing and going away therefrom:

- an inner zone of reverse taper ratio, i.e. of chord that increases;
- a forward-swept zone of chord that initially increases and then decreases; and
- a back-swept zone of chord that decreases.

It is recalled that by convention a zone is said to be swept "forwards" when its leading edge forms a positive angle relative to the axis of the blade, i.e. extends forwards in the direction of rotation of the rotor, and a zone is said to be swept "back" when its leading edge forms a negative angle.

That multi-zone blade presents advantages in reducing noise pollution. The sequence of a forward-swept zone followed by a back-swept zone avoids the leading edge of the blade being parallel to the axes of the vortices generated by the preceding blades, all along the span of the blade. In addition, the taper ratio of the back-swept zone has a favorable influence on noise since:

- for given profile, thickness decreases with shortening chord, thereby reducing so-called "thickness" noise; and
- the area of the blade is reduced by the taper ratio, thereby also reducing its lift, which reduces so-called "load" noise.

Nevertheless, such a blade presents limitations dynamically speaking, since it does not present satisfactory locations for centers of special interest, i.e. the aerodynamic focus, the center of gravity, and the elastic center relative to the pitch axis. This results in excessive control forces and in poor overall dynamic behavior of the rotor.

In addition, its aerodynamic performance is not as good as that of a conventional blade having the same area. In particular, its figure of merit in hovering is smaller and the advancing blade stalls prematurely under heavy weight during forward flight.

The reverse taper ratio of the inner zone is advantageous in that it enables the weight of the blade to be reduced. Nevertheless, it is necessary for the root of the blade, i.e. the beginning of the inner zone, to be capable of withstanding the twisting moments that are generated thereat, more particularly because of the presence of the back-swept zone. It is therefore necessary to stiffen the blade by increasing its thickness on coming closer to the axis of the rotary wing.

The profile of the blade is thus very complex since its profile must not only taper going away from the axis of the rotary wing, it must also become thicker goes towards said axis.

There is no need to remind the person skilled in the art of the difficulties involved with such complexity.

It also turns out that the taper ratio of the inner zone severely penalizes behavior while hovering, and that has a direct influence on the maximum takeoff weight.

OBJECTS AND SUMMARY OF THE INVENTION

Thus, an object of the present invention is to provide a relatively quiet blade that presents good dynamic behavior and improved aerodynamic performance.

According to the invention, a rotary wing blade comprises in succession along a reference radius corresponding to a rotor disc radius i.e. to a radius of said rotary wing: an inner zone; a forward-swept zone; and a back-swept zone; furthermore, the beginning of the forward-swept zone lies in the range 0.47 to 0.65 times said reference radius.

The beginning of the back-swept zone lies in the range 0.75 to 0.90 times the reference radius.

In addition, the forward-swept zone presents a sweep angle lying in the range 5° to 10°.

Similarly, the back-swept zone presents a sweep angle lying in the range −15° to −30°.

Advantageously, the back-swept zone presents a chord that is constant and equal to the chord of the outermost section of said forward-swept zone.

This reduces constraints on blade manufacture.

In a preferred embodiment, the taper ratio of the back-swept zone lies in the range 1 to 2, i.e. the ratio of the chord of the innermost section of said zone over the chord of the outermost section of the same zone lies in the range 1 to 2.

Furthermore, for a blade further including an outer zone following the back-swept zone, said outer zone is also tapered.

The taper ratio and the thinning of the outer zone present the advantages both of improving aerodynamic performance while hovering and at high speed, and also of reducing noise when overflying.

By way of example, the beginning of the outer zone may lie in the range 0.92 to 0.97 times the reference radius.

This taper ratio is preferably parabolic and the leading edge presents an angle lying in the range −40° to −60° relative to the axis of the blade at the reference radius from the axis. At this location, the thickness lies in the range 6% to 8% of the chord.

Having the leading edge angled in this way at the reference radius is particularly important since it serves to reduce the incident Mach number, i.e. the quotient of the air speed of the profile measured perpendicularly to its leading edge divided by the speed of sound.

The aerodynamic behavior of a blade is directly associated with the incident Mach number on the blade.

Thus, reducing the incident Mach number at the tip of the blade enables it to operate continuously in the subsonic range, thereby avoiding the compressibility shocks that are specific to the transonic range.

Furthermore, acoustically speaking, reducing the incident Mach number has the consequence of reducing noise.

In addition, the blade includes a twisted segment complying with a twisting relationship.

Advantageously, the beginning of the twisted segment coincides with the beginning of the inner zone.

The twisting relationship is preferably linear out to at least 0.9 times the reference radius, and it presents a coefficient lying in the range −10° to −13° divided by the reference radius.

According to an additional characteristic, the blade includes a dihedral-forming slope in the outer zone at its tip.

The angle of inclination δ of this slope lies in the range 10° to 20° at the reference radius.

In addition, the beginning of the profiled inner zone lies in the range 0.15 to 0.30 times the reference radius.

Preferably, the reference radius lies in the range 5.0 meters (m) to 10.0 m.

Furthermore, the blade includes at least one section presenting a profile of thickness lying in the range 6% to 8%, this section being included in the outer zone.

Similarly, the blade includes at least one segment presenting a profile of thickness lying in the range 8% to 10%, said segment being situated beyond 75% of the reference radius. Remarkably, this segment includes at least one section of thickness equal to 9%.

Advantageously, the inner zone presents a chord that is constant.

This chord lies in the range L to 1.1 times L where L is given by:

$$L = \frac{\int_{R0}^{R} L(r) r^2 \, dr}{\int_{R0}^{R} r^2 \, dr}$$

L(r) being the relationship defining how the chord varies along the span, R0 being the radius at the beginning of the profiled portion, and R being the reference radius.

Likewise, the forward-swept zone presents a chord that is constant and equal to the chord of the inner zone.

BRIEF DESCRIPTION OF THE DRAWING

The present invention appears in greater detail in the following description of an embodiment given by way of illustration with reference to the accompanying figures, in which.

MORE DETAILED DESCRIPTION

Elements that are present in both figures are given the same references in each of them.

Figure 1:
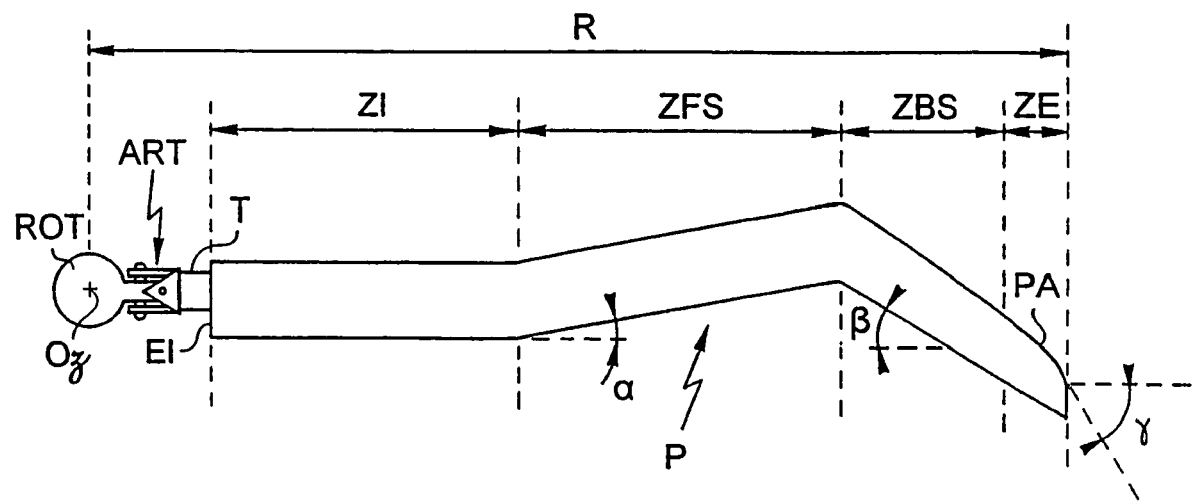
FIG. 1 is a plan view of a blade.

With reference to FIG. 1, a blade P is secured by a connection element T to lead-lag and flapping hinges shown diagrammatically at ART and connected to a drive shaft ROT, rotating about a substantially vertical axis Oz.

The free or outer end EE of the blade is at a distance R from the axis Oz that is referred to herein as the "reference radius" R.

The blade P comprises in succession:
an inner zone ZI which begins at an inner end EI secured to the connection element T;
a forward-swept zone ZFS;
a back-swept zone ZBS; and
an outer zone.

The inner end EI corresponding to the beginning of the profiled portion of the blade is preferably at a distance from the rotor axis that lies in the range 15% to 30% of the reference radius, and that is ideally 27%.

The boundary between the inner zone ZI and the forward-swept zone ZFS advantageously lies in the range 47% to 65% of the reference radius, and is ideally 60%.

The boundary between the forward-swept zone ZFS and the back-swept zone ZBS lies in the range 75% to 90% of the reference radius, and is ideally 85%.

The boundary between the forward-swept zone ZFS and the outer zone ZE lies in the range 0.92 to 0.97 times the reference radius.

The inner zone ZI presents a chord that is constant and lies in the range 1 to 1.1 times L, and is ideally 1.07 times L, where L is given by:

$$L = \frac{\int_{R0}^{R} L(r) r^2 \, dr}{\int_{R0}^{R} r^2 \, dr}$$

L(r) being the relationship defining how the chord varies along the span, R0 being the radius at the beginning of the profiled portion, and R being the reference radius.

Preferably, the forward-swept zone ZFS also presents a chord that is constant and of a value that is consequently equal to that of the inner zone ZI. The forward-sweep angle α lies in the range 5° to 10° and is preferably 7°.

The back-swept zone ZBS preferably presents a chord having a taper ratio between its two ends lying in the range 1 to 2, and ideally being equal to 1.5. The taper ratio should be understood as being the ratio of the chord of the innermost section, i.e. the section adjacent to the forward-swept zone, over the chord of the outermost section, i.e. the section adjacent to the outer zone. The sweep angle β lies in the range −15° to −30°, and is preferably equal to −25°.

The outer zone ZE presents a leading edge that describes a parabola, such that it presents an angle γ lying in the range −40° to −60°, and ideally equal to −45°, at the reference radius, i.e. at the outer end of the blade.

Figure 2:
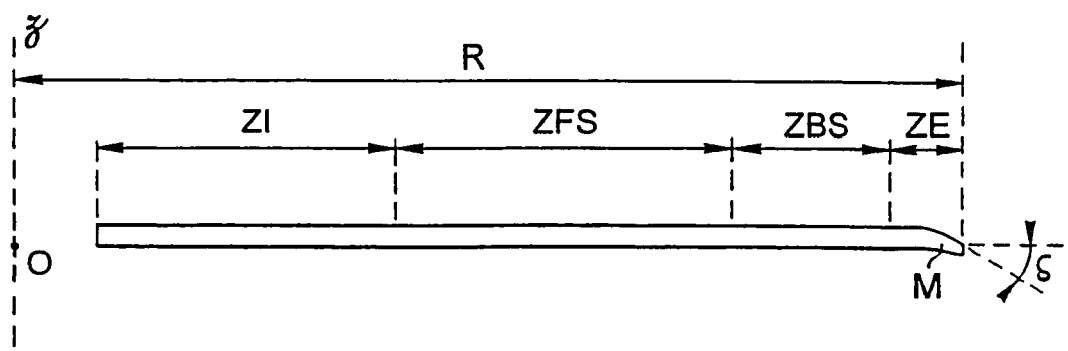
FIG. 2 is a front view of the same blade.

Finally, the blade is terminated by a slope M forming a dihedral as shown in FIG. 2. This slope M slopes downwards, presenting an angle of inclination δ which can lie in the range 10° to 20°, and is ideally 16°.

Furthermore, a segment of the blade is twisted. This segment may extend from the inner zone to the outer zone. Preferably, the twisting relationship is linear and presents a coefficient lying in the range −10°/R to −13°/R, where R is the reference radius, as above. Ideally, the coefficient is equal to −12°/R.

What is claimed is:

1. A blade for a rotary wing which comprises in succession along a reference radius R: an inner zone; a forward-swept zone; and a back-swept zone; wherein the beginning of said forward-swept zone lies in the range 0.47 to 0.65 times said reference radius R, and wherein the leading edge of said blade at said reference radius R presents an angle γ lying in the range −40° to −60° relative to a general axis of said blade, wherein a taper ratio of said backswept zone lies in the range 1 to 2.

2. A blade according to claim 1, wherein the beginning of said back-swept zone lies in the range 0.75 to 0.90 times said reference radius R.

3. A blade according to claim 1, wherein said forwards-swept zone presents a sweep angle lying in the range 50° to 10°.

4. A blade according to claim 1, wherein said back-swept zone presents a sweep angle lying in the range −15° to −30°.

5. A blade according to claim 1, wherein said back-swept zone presents a chord that is constant and equal to the chord of the outermost section of said forward-swept zone.

6. A blade according to claim 1, further comprising an outer zone following said back-swept zone, said outermost zone presenting a taper ratio.

7. A blade according to claim 6, wherein the beginning of said outer zone lies in the range 0.92 to 0.97 times said reference radius R.

8. A blade according to claim 6, including at least one section presenting a thickness profile lying in the range 6% to 8%, said section being included in said outer zone.

9. A blade according to claim 1, including a dihedral-forming slope M at its outer tip.

10. A blade according to claim 9, wherein the angle of inclination 5 of said slope at said reference radius lies in the range 100 to 200.

11. A blade according to claim 1, wherein the beginning of said inner zone lies in the range 0.15 to 0.30 times said reference radius R.

12. A blade according to claim 1, wherein said reference radius lies in the range 5.0 m to 10.0 m.

13. A blade according to claim 1, including at least one segment having a thickness profile lying in the range 8% to 10%, said segment being situated at more than 75% of said reference radius R.

14. A blade according to claim 13, wherein said segment includes at least one section of thickness equal to 9%.

15. A blade according to claim 1, wherein said inner zone presents a chord that is constant.

16. A blade according to claim 15, wherein the chord of said inner zone lies in the range L to 1.1 times L, where L is given by:

$$L = \frac{\int_{R0}^{R} L(r) r^2 \, dr}{\int_{R0}^{R} r^2 \, dr}$$

L(r) being the relationship defining how the chord varies along the span, R0 being the radius at the beginning of the profiled portion, and R being the reference radius.

17. A blade for a rotary wing which comprises in succession along a reference radius R: an inner zone; a forward-swept zone; and a back-swept zone; the beginning of said forward-swept zone lying in the range 0.47 to 0.65 times said reference radius R, wherein the leading edge of said blade at said reference radius R presents an angle γ lying in the range −40° to −60° relative to a general axis of said blade and wherein said back-swept zone presents a chord that is constant and equal to the chord of the outermost section of said forward-swept zone.

18. A blade for a rotary wing which comprises in succession along a reference radius R: an inner zone; a forward-swept zone; and a back-swept zone; the beginning of said forward-swept zone lying in the range 0.47 to 0.65 times said reference radius R, wherein the leading edge of said blade at said reference radius R presents an angle γ lying in the range −40° to −60° relative to a general axis of said blade and wherein the chord of said inner zone lies in the range L to 1.1 times L, where L is given by:

$$L = \frac{\int_{R0}^{R} L(r) r^2 \, dr}{\int_{R0}^{R} r^2 \, dr}$$

L(r) being the relationship defining how the chord varies along the span, R0 being the radius at the beginning of the profiled portion, and R being the reference radius.

19. A blade for a rotary wing which comprises in succession along a reference radius R: an inner zone; a forward-swept zone; and a back-swept zone; wherein the beginning of said forward-swept zone lies in the range 0.47 to 0.65 times said reference radius R, and wherein the leading edge of said blade at said reference radius R presents an angle γ lying in the range −40° to '60° relative to a general axis of said blade, wherein a taper ratio of said backswept zone lies in the range 1 to 2, and wherein said forwardswept zone presents a chord that is constant.

20. A blade according to claim 19, wherein said chord of said forward-swept zone is equal to the chord of said inner zone.

* * * * *